Aug. 3, 1943.   C. P. BERGMAN ET AL   2,325,732
REPEATING MECHANICAL VALVE SHUT-OFF SYSTEM
Filed Feb. 2, 1940   3 Sheets-Sheet 1

INVENTORS
CHARLES P. BERGMAN
MEAD CORNELL
ATTORNEY

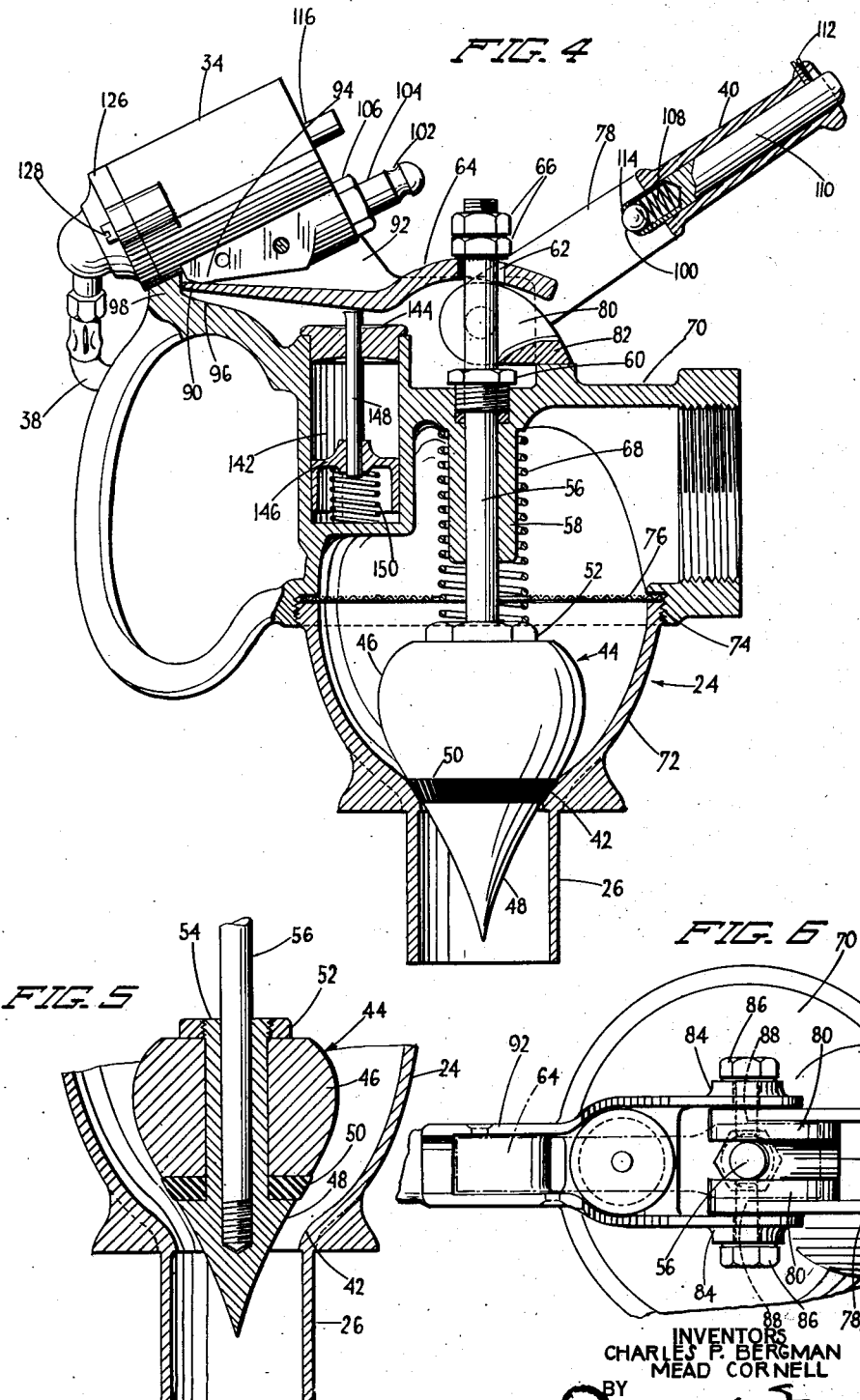

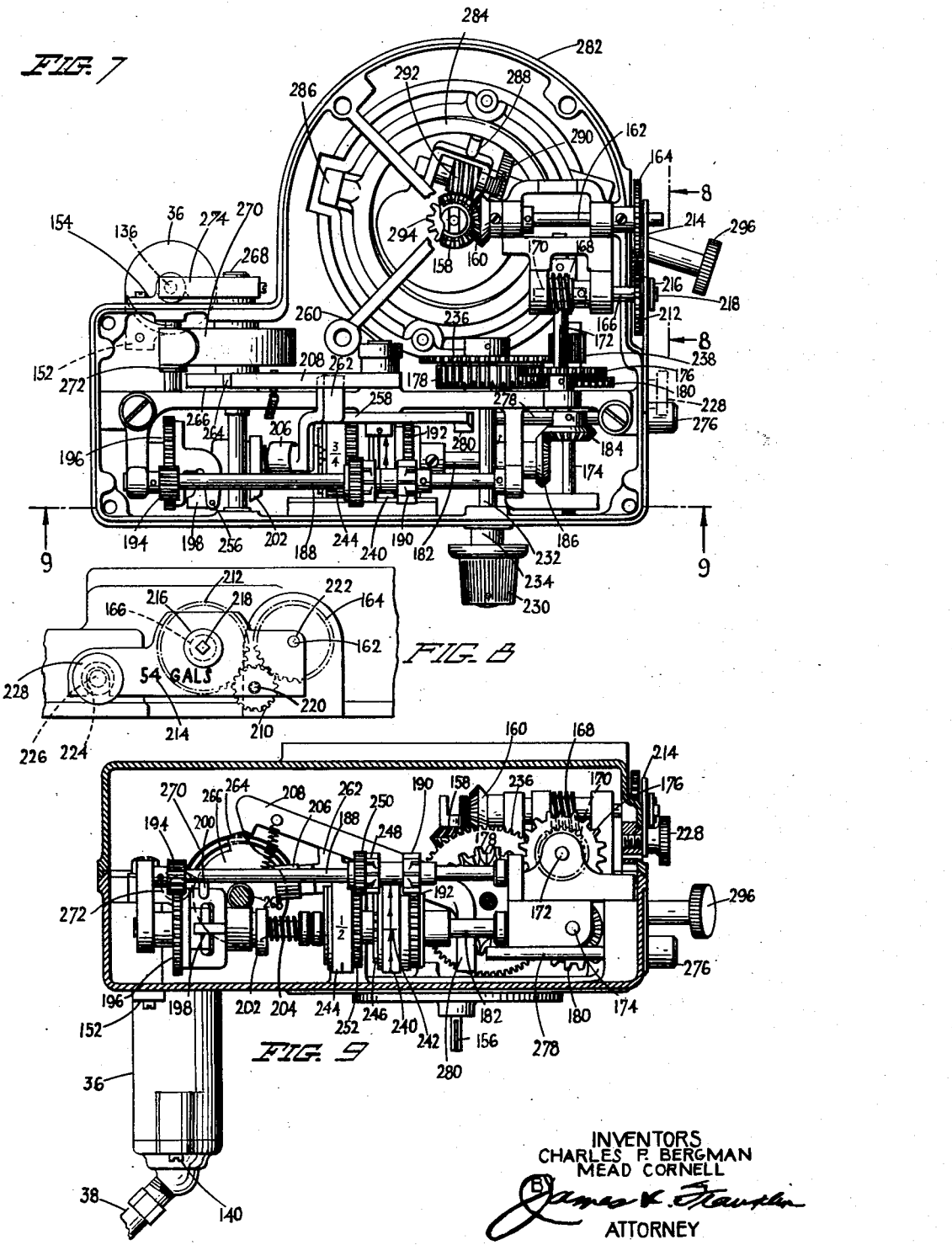

Patented Aug. 3, 1943

2,325,732

UNITED STATES PATENT OFFICE 2,325,732

REPEATING MECHANICAL VALVE SHUTOFF SYSTEM

Charles P. Bergman, San Francisco, Calif., and Mead Cornell, Cleveland, Ohio, assignors, by mesne assignments, to Pittsburgh Equitable Meter Company, Pittsburgh, Pa., a corporation of Pennsylvania Application February 2, 1940, Serial No. 316,888

3 Claims. (Cl. 137—139)

This invention relates to liquid measuring apparatus, and more particularly to a repeating valve shut-off system, particularly for rapid measured filling of large containers, for example, barrels.

The primary object of our invention is to generally improve automatic valve shut-off mechanisms, particularly for repeated shut-off at one quantity, as when filling uniform containers such as barrels.

A more particular object of our invention is to make it possible to use a valve at the nozzle end of a flexible hose, with all necessary starting controls centered at the nozzle, so that the operator may remain at the end of the hose, and insert the nozzle into the successive barrels, with no need to go to the trip register between filling operations.

Another object is to eliminate the need for pump pressure delivery, the mechanism and valve being mechanical rather than hydraulic, so that the barrels may readily be filled by gravity flow.

A further object of our invention is to provide an improved flexible motion-transmitting means between the starting lever at the valve, and the trip mechanism at the register.

Further objects center about the provision of an improved shut-off valve for the present purpose, and include making the internal valve body and the valve elements in smooth, streamlined form, with a nozzle discharge immediately below the valve, so as to avoid swirl, turbulence and foaming of the liquid; providing the valve body with a screen which further helps straighten out the liquid flow; making the valve and discharge nozzle as nearly as possible dripless, for which purpose the screen is located above the valve member; and making the valve member itself with a yieldable or gasket-like material (preferably Neoprene) held between upper and lower metal bodies, the said three parts of the valve member having the desired smooth, streamlined contour.

In accordance with other features and objects of the invention, the valve is closed by spring pressure and is opened by cams rotated by a handle, and the cam action is taken through a pivoted arm held against longitudinal movement in order to avoid side thrust on the valve rod. The valve is equipped with a dashpot which is so arranged as to slightly soften and time the closing of the valve when the handle is released by the trip mechanism. This helps insure accurately repeated delivery. The dashpot is arranged for spring movement in one direction, so that it need not be connected to the valve-opening handle and does not restrain opening of the valve, nor oppose the detent holding the valve open.

To the accomplishment of the foregoing and other objects which will hereinafter appear, our invention consists in the repeating mechanical valve shut-off system elements and their relation one to the other, as hereinafter are more particularly described in the specification and sought to be defined in the claims. The specification is accompanied by drawings in which:

Fig. 4 is a section taken in elevation through the valve used in the shut-off system;

Fig. 5 is a fragmentary section similar to Fig. 4, but showing the valve open;

Fig. 6 is a plan view of the valve with the arm and detent mechanism removed to better expose the parts therebeneath;

Fig. 7 is a plan view of the trip register mechanism with the cover removed, and may be considered as taken in the plane of the line 7—7 of Fig. 1;

Fig. 8 is a side elevation of a changeable gear plate looking in the plane of line 8—8 of Fig. 7; and Fig. 9 is a section taken in elevation in the plane of the line 9—9 of Fig. 7, with the trip register mechanism removed from the meter body.

Figure 1:
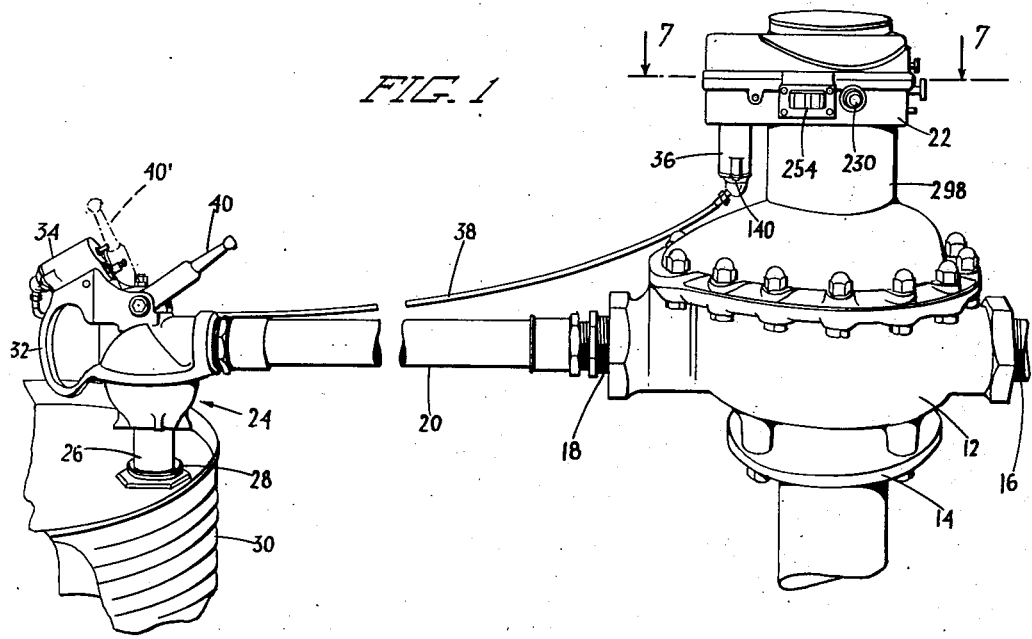
Fig. 1 is a perspective view showing an automatic valve shut-off system embodying features of our invention.

Referring to the drawings, and more particularly to Fig. 1, the shut-off system comprises a meter 12 supported on a suitable pedestal 14 and supplied with liquid at the inlet 16. The liquid is discharged at outlet 18 into a flexible pipe or hose 20 of suitable length. A trip register 22 is mounted on top of the meter body and is driven by the piston or driving element of the meter.

At the remote or free end of hose 20, a valve 24 is connected, the body of which includes a short downwardly directed nozzle 26 adapted to be freely inserted in the filling opening 28 of a barrel 30. The valve and nozzle may be moved about by means of a suitable handle 32. The flow of liquid into the barrel is controlled by means of a starting lever 40 which for this purpose, is pulled from the right-hand position shown, to the left-hand position 40', where it is held by suitable detent mechanism. A flexible motion-transmitting means extends between the valve 24 and the trip register 22. In the present case, this comprises a metallic bellows housed at 34 near the valve detent mechanism, and another metallic bellows housed at 36 near the trip mechanism, with a flexible tube 38 connected therebetween. By sealing a liquid in the bellows and tube assembly, movement applied to one bellows may be imparted from one bellows to the other. Thus the opening of the valve by lever 40 may be used to latch the trip mechanism at register 22, and tripping at the register may later be used to release the valve detent and to cause closing of the valve.

Referring now to Figs. 4, 5 and 6, it will be noted that the interior of valve body 24 is given a smooth, streamlined shape leading into a short, straight, downwardly directed nozzle 26, and that the valve seat 42 does not appreciably change the desired streamlined shape. The valve member 44 is also given a smoothly tapered, streamlined configuration somewhat like a top or plumb-bob. As is best shown in Fig. 5, the valve member is made up of an upper metallic body 46, a lower metallic body 48, and a lamination of yieldable material or gasket-like member 50 therebetween. The latter may be squeezed between the upper and lower metallic bodies, as by means of nut 52 threadedly received on a threaded sleeve 54 formed integrally with and extending upwardly over the lower part 48. The periphery of gasket 50 is made to conform to the desired tapered, streamlined shape of valve member 44. It bears against seat 42 primarily by reason of this taper. It may be made to project very slightly from the surface of the valve member, but this projection has been exaggerated in Fig. 5 in order to make the same visible. The gasket may be made of Neoprene.

A valve rod 56 is fixedly secured to the valve member 44, as by means of a threaded connection. Reverting now to Fig. 4, it will be seen that valve rod 56 passes upwardly through a guide or bearing 58 of substantial length, and thence through packing which is compressed by a suitable threaded gland 60. The valve rod then passes through a preferably elliptical or elongated opening 62 in an arm 64 above which a pair of lock nuts 66 are secured. Elevation of arm 64 opens the valve. The valve is normally closed by means of a compression spring 68 housed within the valve body and surrounding the bearing 58, as is clearly shown in the drawings.

The valve body is made out of two main parts, the upper part 70 receiving the lower part 72 at a threaded connection 74. A wire mesh screen 76 is preferably clamped in position between the upper and lower parts 70 and 72, the function of this screen being to steady and to smoothen the flow of the liquid as it is changed from movement in a horizontal direction to movement in a vertical direction. It minimizes turbulence, and this is especially desirable when filling containers with a liquid having a tendency to foam. It should be particularly noted that the screen 76 is located above the valve member 44 and valve seat 42. This minimizes drippage from the valve after the valve has been shut off. There will be a very slight momentary drip from the nozzle 26 and the lower tip of the valve member, but there is no prolonged dripping such as takes place when the shut-off point of the valve is remote from the tip of the nozzle, or when a screen such as the screen 76 is disposed below the valve member, for the screen itself tends to collect a considerable quantity of liquid in its mesh, which liquid later drips.

Referring now to Figs. 4 and 6, the starting lever or handle 40 is bifurcated at its lower end, it being divided into arms 78 which terminate in cams 80 which preferably straddle the valve rod 56. The lower right-hand extremities of cams 80 may be connected by a suitable web or bridge 82, and all of these parts, that is, the handle 40, the arms 78, the cams 80 and the bridge 82, may be cast integrally. The arms 78 are pivotally mounted between stationary bearings 84 which project upwardly from and form a part of the upper valve body 70. While not essential, it is desirable that the cams 80 be pivoted on an axis intersecting the axis of valve rod 56. For this purpose the cams turn on studs or trunnions which terminate on each side of the valve rod 56. Specifically, the bearings 84 are threaded to receive screws 86 which are tightened into position and remain fixedly related to bearings 84. The inner ends 88 of screws 86 are turned smooth to act as pins freely received in cams 80.

One end of arm 64 overlies the cams 80 and acts as a cam follower. The other end 90 of arm 64 is received between the side walls 92 of the valve body. These side walls are designed to receive a part 94 projecting downwardly from and formed integrally with the bellows housing 34. When part 94 is fastened into position, it forms an effective part of the casing, and the end 90 of arm 64 is pivotally received between the part 96 of the valve body and the part 94 of housing 34. Moreover, the arm 64 is held against sideward movement toward the left as viewed in Fig. 4, by the part 98 of the valve body.

It will be evident that as handle 40 is swung from the right-hand position shown in Fig. 4 to its left-hand position, the cams 80 will bear against and raise the arm 64, which in turn bears against the nuts 66 and raises the valve rod and thus opens the valve. No sideward thrust is applied to the valve rod because the end 90 of arm 64 abuts against the part 98 of the valve body. Moreover, the hole 62 through arm 64 is made over-sized and is preferably made elliptical with its longer axis extending lengthwise of the arm, so that there is clearance between the arm and the valve rod during operation of the handle 40.

When the handle is moved to its left-hand position, it is there held by suitable friction detent mechanism. In the present case the handle is provided with a spring-pressed ball 100 which is received in a recess 102 fixedly related to the valve body. Specifically, the recess 102 is an annular groove turned on the end of a rod 104 which is threadedly received in the part 94 of housing 34 and which is locked in position by a nut 106. The rod 104 may be turned somewhat when worn, thus presenting a new surface for cooperation with the ball 100.

Ball 100 and the spring 108 pressing the same are housed in the lower end of a rod 110. The latter is received in a hole passing through handle 40 and is locked in position by a set screw 112. The lower end of rod 110 is drilled to hollow the same, and after inserting the spring 108 and ball 100, the edge is preferably turned or spun inwardly somewhat, as is indicated at 114, in order to hold the ball against expulsion by the spring. It will be understood that the position of ball 100 relative to the stop groove 102 may be adjusted by sliding rod 110 longitudinally and then fixing its position by means of set screw 112. In this way the firmness of the detent action may be adjusted.

Figure 2:
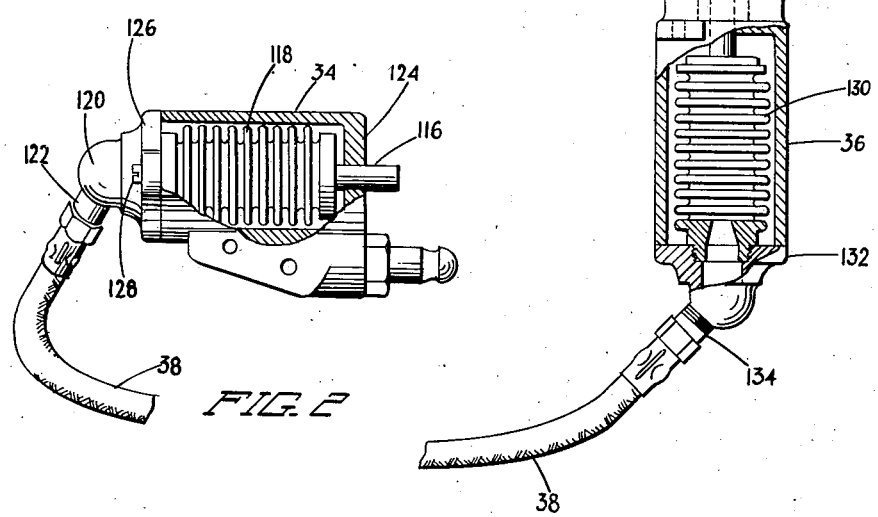
Fig. 2 is a partially sectioned side elevation of a metallic bellows used at the valve detent.

When the starting handle 40 is swung to the left it bears against and presses a pin 116 inwardly. Referring now to Fig. 2, it will be seen that pin 116 is secured to the movable right-hand end of a metallic bellows 118 of the Sylphon or similar type. The end to which pin 116 is secured, is sealed. The opposite end opens into a connection 120, the nipple 122 of which receives a flexible tube 38. The pin 116 is freely slidable in the end 124 of housing 34. The opposite end or head 126 of the housing is preferably supplied with the bellows, so that the two bellows and the connecting tube may form a sealed combination. In that case the housing is completed by simply assembling the head 126 with the shell 34, the latter being passed around the pin 116 and bellows 118. The parts are secured together by screws 128.

Figure 3:
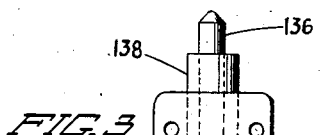
Fig. 3 is a partially sectioned elevation of a metallic bellows used at the register trip mechanism.

Referring now to Fig. 3, it will be seen that a generally similar bellows 130 is provided within housing 36. In this case the lower end of the bellows is secured to the lower head 132, which in turn receives tube 38 by means of a nipple 134. The upper end of bellows 134 is sealed, and carries a pin 136 which is slidable in a bearing 138 formed integrally with housing 36. The housing and the bottom head 132 are secured together by screws which are not visible in Fig. 3, but one of which may be seen at 140 in Figs. 1 and 9.

A suitable liquid is sealed within the bellows assembly and tube, and the resulting construction constitutes a flexible motion-transmitting means such that inward movement of pin 116 causes outward movement of pin 136, and conversely, inward movement of pin 116 causes outward movement of pin 136. Thus, to shut the valve, the trip mechanism at the register forces pin 136 downwardly, thereby ejecting pin 116, which in turn frees the detent action on handle 40 by simply forcibly dislodging the handle from the detent. The handle then swings over to the right-hand position shown in Figs. 1 and 4, the valve being closed by its compression spring 68. Most of the closing movement of the handle is beyond its vertical position, so that the handle actually falls gravitationally.

In Fig. 4 it will be observed that the upper part of the valve body has a dashpot cylinder 142 formed integrally therewith. This cylinder is closed at the top by a cylinder head 144. A piston 146 is slidable in cylinder 142, and is connected to arm 64 by means of a piston rod 148. The piston 146 is urged upwardly by means of a spring 150. When starting handle 40 is moved to open the valve, the arm 64 is raised and leaves piston rod 148 behind. There is accordingly no obstruction to very rapid opening of the valve, and no resulting wear or abuse of the dashpot mechanism. The valve remains open for a substantial period while the barrel is filled, and during this time piston 146 is slowly raised by spring 150. It will be understood that the cylinder 142 may be filled with oil, or more simply, with air, as here shown. The damping action provided by the dashpot depends upon the accuracy of the fit of piston 146 in cylinder 142, and need not be great.

When the valve is closed, the dashpot softens the closing impact of the valve. It shows up the closing action slightly, but the closing action becomes a definite and timed action which helps obtain accurate repeat measurement, that is, the lag between tripping at the register and closing at the valve is made a relatively fixed amount.

Referring now to Figs. 7 and 9, the trip register mechanism there shown is much like that disclosed in a co-pending application of Mead Cornell and Alexander R. Whittaker, Serial Number 260,270, filed March 7, 1939, and entitled "Repeating valve shut-off system." However, in that case the trip mechanism was arranged for operation of a pilot valve of a hydraulic system, whereas in the present case the trigger action is applied directly to the pin 136 projecting upwardly from the bellows casing 36, the latter being attached to the housing of the trip register, as shown in Figs. 7 and 9 of the drawings, as by means of the attaching flanges 152 and 154.

The drive from the meter is applied to shaft 156 (Fig. 9). This is connected through mitre gears 158, 160 to a sidewardly extending shaft 162 (Fig. 7), the latter carrying at its outer end a fixed or non-removable gear 164. This drives a worm shaft 166 through appropriate changeable gears. Worm 168 mounted on shaft 166 meshes with a subjacent worm gear 170 mounted on a forwardly extending shaft 172. This, in turn, drives shaft 174, but the drive is made indirect in order to accommodate a manual reset mechanism which is subsequently described. Specifically, shaft 172 carries a gear 176 which meshes with an idle gear 178, which in turn meshes with a gear 180 carried on shaft 174.

Shaft 174 is geared to a cam shaft 182 by means of mitre gears 184, 186. Cam shaft 182 carries a cam 202 which is rotatable with but axially movable along the cam shaft. A transfer shaft is provided, this being numbered 188. Transfer shaft 188 carries a transfer pinion 190 which cooperates with a mutilated gear 192 carried on cam shaft 182. In this way the transfer shaft 188 is given intermittent motion. The transfer shaft also carries a pinion 194 meshing with a gear 196 freely rotatable on the cam shaft. Gear 196 carries a cam shifter 198 while transfer shaft 188 carries a pin 200. When pin 200 and the cam shifter 198 come into coincidence, the cam 202 is moved axially against spring 204 into a position cooperative with a cam follower 206. This is preparatory to tripping of the valve, and as cam 202 is rotated by the cam shaft it raises the cam follower 206. This trips the valve, as is later described.

The changeable gears are best shown in Fig. 8. Gear 164 is a fixed gear permanently secured to shaft 162. The changeable gears are an idler 210 and a driven gear 212, these being carried on a readily removable gear plate 214. Gear 212 is secured to a hub 216 having a square hole, and the outer or projecting end 218 of shaft 166 is squared to receive the gear. The hub 216 is freely rotatable in plate 214, but is not removable therefrom. The idler or pinion 210 is freely rotatable on but not removable from a stud 220 which is riveted to plate 214. Plate 214 is provided with a hole 222 which fits freely over the outermost end of shaft 162 (see Fig. 7). It is also provided with a slot 224 (Fig. 8) which fits over the shank 226 of a thumb screw 228 (Fig. 9). The plate 214 together with the idler 210 and driven gear 212 is readily removed by removing the thumb screw 228, and thereupon moving the plate outwardly off the shafts. Another plate with different gears may be applied to change the trip quantity, all of the plates being interchangeable.

In each case the driven gear is so located relative to the hole 222 as to fit properly over the square end 218 of shaft 166. The idler 210 is so selected as to mesh with the gears 164 and 212, for despite the fixed center-to-center distance of shafts 162 and 166, the size of gear 212 may differ on the different gear plates, the change being compensated by a different size or/and location of the idler. To prevent confusion, each plate is conspicuously marked with the number of gallons delivery it represents (see Fig. 8).

The removable gear arrangement makes it readily possible to obtain a desired trip quantity by establishing the necessary gear ratio. Furthermore, the arrangement may be so designed that the number of teeth on the driven gear 212 corresponds numerically to the trip quantity or number of gallons to be supplied. Barrels range in size from fifty to fifty-five gallons. In the present apparatus, the gear 212 has fifty teeth for a fifty-gallon barrel, fifty-one teeth for a fifty-one gallon barrel, and so on. Ordinarily, the apparatus is supplied with six gear plates covering a range of from fifty to fifty-five gallons. However, a much wider range is available, and to fill special requirements the gear 212 may, for example, have only fourteen teeth, corresponding to the filling of small fourteen-gallon barrels.

The manner in which this result is obtained in the specific mechanism here disclosed, is as follows:

Referring to Figs. 7 and 9, the meter shaft 156 turns one rotation for one gallon of flow, (there being, of course, a reduction gear train between the meter piston and shaft 156, this being the so-called "intermediate" located near the top of the meter body). Shaft 162 also turns one revolution for one gallon. Fixed gear 164 has forty teeth. Assume driven gear 212 also has forty teeth, in which case shaft 166 and worm 168 turn one revolution for one gallon. The worm ratio is 10 to 1, and in the specific construction herein shown, the worm is a double worm, while the worm gear 170 has twenty teeth. The gears 176 and 180 are equal, hence shaft 174 turns once for ten gallons, and similarly the cam shaft 182 turns once for ten gallons. The mutilated or transfer gear 192 has ten teeth, while transfer pinion 190 has eight teeth, thus producing one and one-quarter revolutions of the transfer shaft for one revolution of the cam shaft. Pinion 194 has eight teeth and gear 196 has twenty teeth, thus producing a reduction ratio of 2½ to 1. The total reduction is, therefore, only 1 to 2. The reason a simple reduction of 1 to 2 is not used between pinion 194 and gear 196 is in order to avoid premature tripping or contact between pin 200 and cam shifter 198. For these parts to engage requires two revolutions of the cam shifter, corresponding to five revolutions of the transfer shaft. This, in turn, requires four revolutions of the cam shaft, and inasmuch as each revolution corresponds to a flow of ten gallons, the arrangement will trip after a flow of forty gallons.

For this result the driven gear 212 on gear plate 214 was provided with forty teeth. If the driven gear 212 is given an increased number of teeth then the tripping point is reached later, or after a greater flow. Thus, with fifty teeth the apparatus will trip at fifty gallons, with fifty-one teeth the apparatus will trip at fifty-one gallons, etc. Or, going in the other direction, with fifteen teeth the apparatus will trip at fifteen gallons.

In some cases the purchaser of the apparatus may require reset mechanism to manually restore the apparatus to zero whenever desired. This is of value, for example, when changing from one kind of oil to another, for in such case the meter and hose will be filled with the old oil. This may be discharged into a waste barrel or the like until the new oil comes through. For this purpose the discharge may be a matter of only ten or fifteen gallons. Without the reset mechanism the discharge of oil must be continued until an amount equal to a full barrel has been discharged, in order to bring the apparatus to zero preparatory to the filling of barrels with the new oil. By providing reset mechanism the extra waste is avoided.

Referring now to Figs. 7 and 9, knob 230 acts as a reset knob and is mounted on a shaft 232 which is both rotatable and axially reciprocable. The shaft is normally urged outwardly by a compression spring which may be housed at 234. Shaft 232 carries a large gear 236 which meshes with a pinion 238 (Fig. 7) carried on shaft 174. The idler gear 178 is freely rotatable on shaft 232, but is axially movable therewith. Knob 230 cannot be rotated unless first pushed inwardly. If pushed inwardly the idler 178 is disengaged from gear 180, and thereby frees the trip mechanism from the meter and from the totalizer, if a totalizer is used. Rotation of knob 230 rapidly spins the shaft 174 and consequently the trip mechanism. In this way, the trip mechanism may be turned to zero without any accompanying change of the meter and totalizer reading.

In order to determine the zero position, the cam shaft 182 is provided with an indicator wheel 240, said wheel having a series of arrows and a cross line 242 (Fig. 9) corresponding to zero. However, the indicator wheel 240 is not alone enough, because the cam shaft turns through four revolutions for the filling of one barrel. Another indicator wheel 244 is therefore provided, and this wheel is freely rotatable on the cam shaft, but is so geared to the transfer shaft as to turn only one revolution for four revolutions of the cam shaft. The wheel 244 is marked in fractions of a barrel, rather than in gallons, for the number of gallons differs in accordance with the size of the gear on the changeable gear plate.

The transfer mechanism for indicator wheel 244 includes a notched disc or mutilated gear 246 (Fig. 9) on wheel 240, this having four teeth. The transfer pinion 248 has eight teeth, and is, therefore, moved a half revolution. Transfer pinion 248 is secured to a pinion 250 which meshes in 2 to 1 ratio with a gear 252 secured to fraction wheel 244. In the specific case here shown the pinion 250 has twenty-four teeth and the gear 252 has forty-eight teeth. The total transfer reduction is, therefore, 4 to 1, the indicator wheel 240 turning four times for one complete revolution of the fraction wheel 244, which is as it should be. The two indicator wheels are exposed through a window 254, best shown in Fig. 1. The knob 230 is simply rotated until the fraction wheel reads zero, and the cross line on the other wheel lines up with a suitable pointer at the window 254.

Cam 202 is constantly rotating with cam shaft 182. For this purpose, a hub of the cam is splined or slidably keyed to shaft 182. The cam is normally moved away from the cam follower 206 by means of the compression spring 204, the parts then assuming the relation shown in the drawings.

The trip element 198 forms a part of a cam shifter which is pivotally mounted at 256 between spaced arms secured to gear 196. The cam shifter is itself a forked member, the branches of which straddle the cam shaft 182. When the trip elements 198 and 200 come into engagement, the cam shifter is forced against the cam and moves it axially beneath the cam follower 206.

The trip elements 198 and 200 are adjusted to engage one another a little before the end of the run, causing cam 202 to slide beneath the cam follower 206. The rise of the cam 202 then bears against the cam follower and raises it. The intermittent or Geneva type gearing between the shafts 182 and 188 make it possible for the cam to be shifted before the tripping point, so that the exact tripping point depends upon the shape of the cam.

Cam follower 206 is carried at the end of a cam follower arm 258 pivoted on a spindle 260. Arm 258 has a sidewardly projecting finger 262 which lies beneath hook 208, thus lifting the hook and disengaging tooth 264. Tooth 264 is formed on a disc 266 secured to a trigger shaft 268. Shaft 268 is normally urged in a counterclockwise direction (as viewed in Fig. 9) by means of a spiral ribbon spring 270, the inner end of the spring being secured to the shaft, and the outer end of the spring being connected to a stationary pin 272.

Outside the register casing the shaft 268 carries an arm 274, the end of which bears against the upper end of bellows pin 136 previously referred to. It will be evident that spring 270 normally urges arm 274 downwardly against the pin and so tends to compress the bellows. When the apparatus is started, and valve handle 40 is pulled to open the valve, the pin 136 is forced upwardly, thus moving shaft 268 until trigger tooth 264 is engaged behind the hook 208. The detent at the valve is inadequate to restrain the powerful coiled trigger spring 270, but the spring is now restrained by latching of the trigger mechanism, and consequently the valve remains open even after the operator removes his hand from the valve lever. The bellows system is not under stress at this time, such as exists during the valve opening and valve closing operations. When the trigger mechanism is tripped, the trigger spring 270 urges arm 274 downwardly, thereby depressing pin 136, and this in turn causes pin 116 at the valve to dislodge the valve handle from the valve detent, whereupon the valve closes under the action of its own compression spring 68.

In the event of an emergency, the valve may be tripped closed by the operator standing at the valve, by simply pulling or hiting the handle in the closing direction, thus dislodging it from its detent. The valve may also be tripped by an operator located at the meter, as by depressing the emergency trip button 276 which in turn causes rod 278 to bear against depending end 280 of cam follower arm 258, thus raising the cam follower and tripping the trigger mechanism of the register.

The apparatus may be further refined by the use of a manually adjustable accuracy regulator which is interposed between the shaft 156 (Fig. 9) and the mitre gear 158 (Fig. 7). This accuracy regulator is preferably of the type disclosed in Bergman Patent No. 2,079,197. It is located in the circular part 282 of the register casing near the bottom thereof. It comprises a tiltable ring 284 mounted on trunnions 286 and operating to oscillate an arm 288 connected to a pawl for intermittently moving a ratchet wheel 290 connected to a worm 292 meshing with a worm gear 294. The ring remains fixed in adjustment as determined by a manually operable knurled knob 296. A suitable scale and pointer as well as a locking screw, may be provided to fix the tilt or adjustment of the orbit ring 284.

Provision may also be made for temperature compensation. The temperature compensating mechanism may be of the type disclosed in the aforesaid co-pending application of Mead Cornell and Alexander R. Whittaker, Serial Number 260,270, and in the present case, is located in the neck 298 (Fig. 1) of the meter body. It comprises a mechanism much like that just described for accuracy regulation, but differing in having the orbit ring automatically floatingly tilted by a temperature-responsive element such as a metallic bellows connected to a bulb or tube filled with a suitable liquid, and immersed in the fluid flowing through the meter.

It is believed that the construction and operation, as well as the many advantages of our improved barrel filling mechanism, will be apparent from the foregoing detailed description thereof. The operator, after first setting the desired trip quantity by applying an appropriate gear plate to the side of the register, stands at the free end of the hose for operation of the valve. He inserts the nozzle part of the valve in a barrel opening and pulls the valve open by means of the handle. Liquid immediately flows through the meter and valve into the barrel. This liquid may be under pump pressure, or may simply flow gravitationally. The operation of pulling the valve handle open, latches the trigger mechanism at the register. The flow of liquid through the meter causes the meter to operate and to turn the register toward its trip point. When the trip point is reached, the trigger spring is unlatched, and the resulting movement of the trigger mechanism is transmitted by means of the flexible bellows to release the valve handle, whereupon the valve closes. The operator then pulls the nozzle out of the barrel and inserts it in the next barrel, and again opens the valve. The setting at the trip register remains unchanged, and there is no need for the operator to move back and forth between the meter and the valve. His work can be carried out entirely at the valve. Thus one barrel after another can be rapidly and expeditiously filled. In the event of an emergency, the flow of liquid may be prematurely cut off either at the valve or at the meter. In such case, the operation of the meter also stops, and will again continue only after the valve has been again opened.

The liquid flowing into the barrel is devoid of excessive swirl and turbulence, and has but little tendency to foam. When the valve is shut off, it is nearly dripless because the screen which helps straighten out the flow of liquid, is located above the valve. The rate of closing of the valve is made uniform by the dashpot, but the construction of the dashpot is such as not to interfere with rapid opening of the valve. The valve is readily opened despite the use of a powerful valve spring, because the handle opens the valve through cams, thus providing a large amount of mechanical advantage. The construction of the cam follower arm is such that there is no sideward thrust on the valve rod, and therefore no tendency to wear with consequent leakage at this point.

It will be apparent that while we have shown and described our invention in a preferred form, many changes and modifications may be made in the structure disclosed without departing from the spirit of the invention as sought to be defined in the following claims.

We claim:

1. A valve comprising a valve chamber and valve seat, a valve member movable therein, a valve rod extending from said valve member, an oscillatable handle at the top of the valve, cams at each side of the valve rod rotated by said handle to lift the rod and open the valve, resilient means normally tending to close the valve, and friction detent means to hold the handle with the valve open and fluid pressure operated means for freeing said handle from said friction detent to allow the valve to close.

2. A valve comprising a valve chamber and valve seat, a valve member movable therein, a valve rod extending from said valve, an oscillatable handle at the top of the valve, cams at each side of the valve rod moved by said handle, an arm overlying said cams and connected to said valve rod to raise the rod, resilient means normally tending to close the valve, means preventing longitudinal movement of the arm when the valve is opened in order to avoid sideward thrust on the valve rod, friction detent means to hold the handle when the valve is open and fluid pressure operated means for releasing said handle from said friction detent to allow the valve to close.

3. A valve comprising a valve chamber and valve seat, a valve member movable therein, a valve rod extending from said valve member, an oscillatable handle at the top of the valve, cams at each side of the valve rod moved by said handle, an arm overlying said cams and connected to said valve rod to raise the rod, resilient means normally tending to close the valve, means preventing longitudinal movement of the arm when the valve is opened in order to avoid sideward thrust on the valve rod, friction detent means to hold the handle when the valve is open, a dashpot associated with said arm to soften and time the closing movement of the valve, said dashpot being so related to the arm as not to obstruct quick opening of the valve, and spring means inside the dashpot to cause the dashpot to follow the arm after the valve has been opened.

CHARLES P. BERGMAN.
MEAD CORNELL.

CERTIFICATE OF CORRECTION.

Patent No. 2,325,732.                                                                August 3, 1943.

CHARLES P. BERGMAN, ET AL.

It is hereby certified that error appears in the printed specification of the above numbered patent requiring correction as follows: Page 3, first column, line 75, for "shows" read --slows--; and that the said Letters Patent should be read with this correction therein that the same may conform to the record of the case in the Patent Office.

Signed and sealed this 30th day of November, A. D. 1943.

(Seal)

Henry Van Arsdale,
Acting Commissioner of Patents.